(12) United States Patent
Wikestad et al.

(10) Patent No.: US 12,487,601 B2
(45) Date of Patent: Dec. 2, 2025

(54) ROBOTIC WORK TOOL SYSTEM, AND METHOD FOR DEFINING A WORKING AREA PERIMETER

(71) Applicant: HUSQVARNA AB, Huskvarna (SE)

(72) Inventors: Daniel Wikestad, Hestra (SE); Ulf Ärlig, Bankeryd (SE); Anton Mårtensson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 699 days.

(21) Appl. No.: 17/782,798

(22) PCT Filed: Nov. 18, 2020

(86) PCT No.: PCT/EP2020/082553
§ 371 (c)(1),
(2) Date: Jun. 6, 2022

(87) PCT Pub. No.: WO2021/110415
PCT Pub. Date: Jun. 10, 2021

(65) Prior Publication Data
US 2023/0015812 A1    Jan. 19, 2023

(30) Foreign Application Priority Data
Dec. 6, 2019  (SE) .................................. 1951414-0

(51) Int. Cl.
*G05D 1/00*    (2024.01)
(52) U.S. Cl.
CPC ......... *G05D 1/0221* (2013.01); *G05D 1/0219* (2013.01); *G05D 1/0274* (2013.01); *G05D 1/0278* (2013.01)
(58) Field of Classification Search
CPC .. G05D 1/0221; G05D 1/0219; G05D 1/0274; G05D 1/0278; G05D 1/246; A01D 34/008; Y10S 901/01
See application file for complete search history.

(56) References Cited

U.S. PATENT DOCUMENTS 9,854,737 B2    1/2018  Yamauchi et al.
2012/0101725 A1  4/2012  Kondekar
(Continued)

FOREIGN PATENT DOCUMENTS

CN      109032147 A1    12/2018
EP        3018548 A      5/2016
(Continued)

OTHER PUBLICATIONS

International Search Report and Written Opinion for International Application No. PCT/EP2020/082553 mailed Feb. 18, 2021.
(Continued)

*Primary Examiner* — Bao Long T Nguyen
(74) *Attorney, Agent, or Firm* — Burr & Forman

(57) ABSTRACT

A robotic work tool system (200) for defining a working area perimeter (105) surrounding a working area (150) in which a robotic work tool (100) is intended to operate. The robotic work tool system (200) comprises a boundary definition unit (300) comprising at least one position unit (175) for receiving position data; and at least one controller (210) for controlling operation of the boundary definition unit (300). The controller (210) being configured to receive, from the position unit (175), position data while the boundary definition unit (300) is moved around the working area (150) to define a preliminary working area perimeter (110). The controller (210) is further configured to identify, based on the received position data, a geometry of the preliminary working area perimeter (110) approximately corresponding to a predefined geometry; and to adjust the identified geometry to define an adjusted working area perimeter (105), wherein the identified geometry is adjusted to correspond to the predefined geometry.

17 Claims, 4 Drawing Sheets

(56) References Cited

U.S. PATENT DOCUMENTS

| | | | |
|---|---|---|---|
| 2017/0273527 A1* | 9/2017 | Han | ........................ B25J 13/006 |
| 2019/0332121 A1* | 10/2019 | Kim | ........................ G06V 10/145 |
| 2020/0050208 A1* | 2/2020 | Frick | ........................ G05D 1/245 |

FOREIGN PATENT DOCUMENTS

| | | |
|---|---|---|
| EP | 3199083 A1 | 8/2017 |
| WO | 2018131884 A1 | 7/2018 |

OTHER PUBLICATIONS

Office Action and Search Report for Swedish Application No. 1951414-0 mailed on May 11, 2020.

\* cited by examiner

ROBOTIC WORK TOOL SYSTEM, AND METHOD FOR DEFINING A WORKING AREA PERIMETER

TECHNICAL FIELD

This disclosure relates to a robotic work tool system as well as a method for defining a working area perimeter surrounding a working area in which a robotic work tool is subsequently intended to operate.

BACKGROUND

A robotic work tool is an autonomous robot apparatus that is used to perform certain tasks, for example for cutting lawn grass. A robotic work tool may be assigned an area, hereinafter referred to as a working area, in which the robotic work tool is intended to operate. This working area may be defined by the perimeter enclosing the working area. This perimeter may include the borders, or boundaries, which the robotic work tool is not intended to cross.

There exist different ways of setting these boundaries for the robotic work tool. Traditionally, the boundaries, or the perimeters, for the working area have been set manually by a user or operator. The user manually sets up a boundary wire around the area, or lawn, which defines the area to be mowed. A control signal may then be transmitted through the boundary wire. The control signal may preferably comprise a number of periodic current pulses. As is known in the art, the current pulses will typically generate a magnetic field, which may be sensed by the robotic work tool. The robotic work tool may accordingly use these signals from the wire to determine whether the robotic work tool is close to, or is crossing a boundary wire. As the robotic work tool crosses the boundary wire, the direction of the magnetic field will change. The robotic work tool will be able to determine that the boundary wire has been crossed and take appropriate action to return into the working area. However, these boundary wires are typically very time consuming to put into place, as the user has to perform this procedure manually. Furthermore, there is a risk that the boundary wires may become damaged, which will prevent the robotic work tool from operating properly within the working area.

In view of the above, another way to set the boundaries for a robotic work tool has been proposed, namely a way that does not use physical boundary wires. The robotic work tool may use a satellite navigation device and/or a deduced reckoning navigation sensor to remain within a working area by comparing the successive determined positions of the robotic work tool against a set of geographical coordinates defining the boundary of the working area. This set of boundary defining positions may be stored in a memory, and/or included in a digital (virtual) map of the working area.

The above-described non-physical boundaries for a working area may reduce the time necessary for installation and setting the boundaries for the working area. The non-physical boundaries may be smooth to install. Generally, they may be set by moving a device, which is able to receive position data, around the working area in order to establish the set of geographical coordinates defining the boundary of the working area in which the robotic work tool is intended to operate. As the boundaries are easy to set, they are also easy to move if the working area, for example, changes. Accordingly, non-physical boundaries provide a flexible solution for defining a working area.

SUMMARY

The inventors of the various embodiments of the present disclosure have realized that even if using non-physical boundaries has many advantages, there do exist drawbacks with the installation of the above proposed wireless working area perimeter that has not yet been addressed. The inventors have realized that even if non-physical boundaries of a working area generally may define accurate boundaries at large open spaces, the installation of the non-physical perimeter may be less accurate when it comes to tight corners or other restricted areas where it may be difficult to manoeuvre the device receiving the position data. Thus, in some cases the installation of the non-physical perimeter will not create a working area as accurately as the working area utilizing a physical boundary wire. The resulting working area perimeter may accordingly be quite rough and may perhaps not fulfilling the user's requirements. Furthermore, if a user tries to accurately cover tight corners or other restricted areas where it may be difficult to manoeuvre the device receiving the position data, this may be very time consuming.

In view of the above, it is therefore a general object of the aspects and embodiments described throughout this disclosure to provide a solution for defining an improved working area perimeter, which is not restricted by tight corners or other restricted areas and which is easy to define.

This general object has been addressed by the appended independent claims. Advantageous embodiments are defined in the appended dependent claims.

According to a first aspect, there is provided a robotic work tool system for defining a working area perimeter surrounding a working area in which a robotic work tool is subsequently intended to operate.

In one exemplary embodiment, the robotic work tool system comprises a boundary definition unit. The boundary definition unit comprises at least one position unit configured to receive position data. The robotic work tool system further comprises at least one controller for controlling operation of the boundary definition unit. The at least one controller is configured to receive, from the at least one position unit, position data while the boundary definition unit is moved at least a portion of a lap around the working area to define a preliminary working area perimeter. The at least one controller is further configured to identify, based on the received position data, a geometry of the preliminary working area perimeter approximately corresponding to a predefined geometry. Thereafter, the at least one controller is configured to adjust the identified geometry of the preliminary working area to define an adjusted working area perimeter.

In some embodiments, the at least one controller is configured to adjust the identified geometry to correspond to the predefined geometry.

In some embodiments, the predefined geometry comprises of at least one from the group comprising: a right-angled corner, a corner at a junction between two straight lines and a curve portion with a certain radius of curvature. The radius of curvature may be selectable.

In some embodiments, the at least one controller is configured to identify a geometry approximately corresponding to a predefined geometry by identifying, based on the received position data, a first substantially straight perimeter segment extending along a first axis. The at least one controller is further configured to identify, based on the received position data, a second substantially straight perimeter segment extending along a second axis transversal to said first perimeter segment. In some embodiments, the at least one controller may be configured to adjust the identified geometry of the preliminary working area to define an adjusted working area perimeter by adjust a corner portion at an intersection between said first and second axes to a conform to the predefined geometry. The radius of curvature on the corner portion may be set, for example, automatically to connect a tangent of the curvature to where either of the first and the second substantially straight perimeter segment ends.

In some embodiments, the robotic work tool system further comprises a user interface configured to display the preliminary working area perimeter and the working area perimeter. The user interface may be configured to receive user input from a user during the user's operation and interaction with said user interface. The at least one controller may be configured to adjust the identified geometry based on the received user input. For example, received user input may identify a predefined geometry to adjust the identified geometry with.

In some embodiments, the boundary definition unit further comprises at least one sensor unit configured to obtain sensed input data while the boundary definition unit is moved at least a portion of a lap around the working area to define a preliminary working area perimeter. The at least one controller is further configured to identify a geometry approximately corresponding to a predefined geometry based on sensed input data. In some embodiments, the sensed input data is associated with environmental data. The sensed input data indicates that a geometry approximately corresponding to a predefined geometry is identified when an obstacle is located in front of the boundary definition unit. In other embodiments, the sensed input data is associated with a direction of the boundary definition unit. The sensed input data indicates that a geometry approximately corresponding to a predefined geometry is identified when a change of the direction is above a threshold In some embodiments, the at least one controller is configured to output a notification when a geometry approximately corresponding to a predefined geometry is identified.

In some embodiments, the at least one position unit is configured to use a Global Navigation Satellite System (GNSS). The at least one position unit may be configured to use Real-Time Kinematic (RTK) positioning.

In some embodiments, the boundary definition unit is the robotic work tool. The robotic work tool may be a robotic lawn mower.

According to a second aspect, there is provided a method implemented by the robotic work tool system according to the first aspect.

In one exemplary implementation, the method is performed by a robotic work tool system for defining a working area perimeter surrounding a working area in which a robotic work tool is subsequently intended to operate. The method comprises receiving, from at least one position unit of a boundary definition unit, position data while the boundary definition unit is moved at least a portion of a lap around the working area to define a preliminary working area perimeter. The method thereafter comprises identifying, based on the received position data, a geometry of the preliminary working area perimeter approximately corresponding to a predefined geometry; and adjusting the preliminary working area to define an adjusted working area perimeter by adjusting the identified geometry.

In some embodiments, the method further comprises adjusting the identified geometry to correspond to the predefined geometry.

In some embodiments, the method further comprises identifying a geometry approximately corresponding to a predefined geometry by identifying, based on the received position data, a first substantially straight perimeter segment extending along a first axis. The method further comprises identifying, based on the received position data, a second substantially straight perimeter segment extending along a second axis transversal to said first perimeter segment. The method may thereafter comprise adjusting a corner portion at an intersection between said first and second axes to conform to the predefined geometry.

In some embodiment, the method further comprises identifying a geometry approximately corresponding to a predefined geometry based on sensed input data, received from a user interface of the robotic work tool system.

In some embodiments, the method further comprises outputting a notification when a geometry approximately corresponding to a predefined geometry is identified.

Some of the above embodiments eliminate or at least reduce the problems discussed above. A robotic work tool system and method are thus provided which may define an accurate working area perimeter in a flexible and simplified way. The working area may be easy to define, while still being defined with a high precision. By identifying geometries that only approximately correspond to a predefined geometry when defining the working area perimeter, it may be possible to refine the perimeter surrounding the working area, such that corners or other restricted areas may be taken into account. By adjusting these identified geometries such that an adjusted working area perimeter is defined, the precision of the working area may be further improved.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
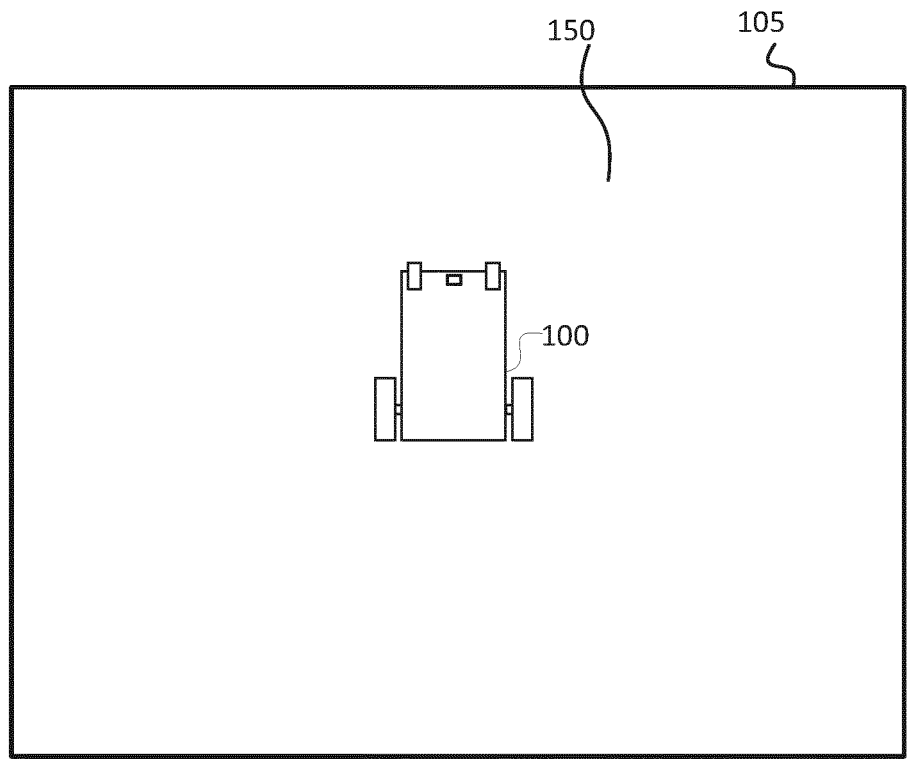
FIG. 1 shows a schematic overview of a robotic work tool in a working area.

In one of its aspects, the disclosure presented herein concerns a robotic work tool system for defining a working area perimeter surrounding a working area in which a robotic work tool subsequently is intended to operate. FIG. 1 illustrates a schematic overview of a robotic work tool 100 in such a working area 150. As will be appreciated, the schematic view is not to scale. If the working area 150 is a lawn and the robotic work tool 100 is a robotic lawn mower, the working area 150 is the area to be mowed by the robotic work tool 100. As seen in FIG. 1, the working area 150 is surrounded by a working area perimeter 105, which sets the boundaries for the working area 150, i.e. defines the boundaries for the working area 150. The robotic work tool 100 is intended to operate within the working area 150 and remain within this area due to the defined working area perimeter 105. By defining the working area perimeter 105, the robotic work tool 100 will not cross the perimeter and only operate within the enclosed area, i.e. the working area 150.

Figure 2:
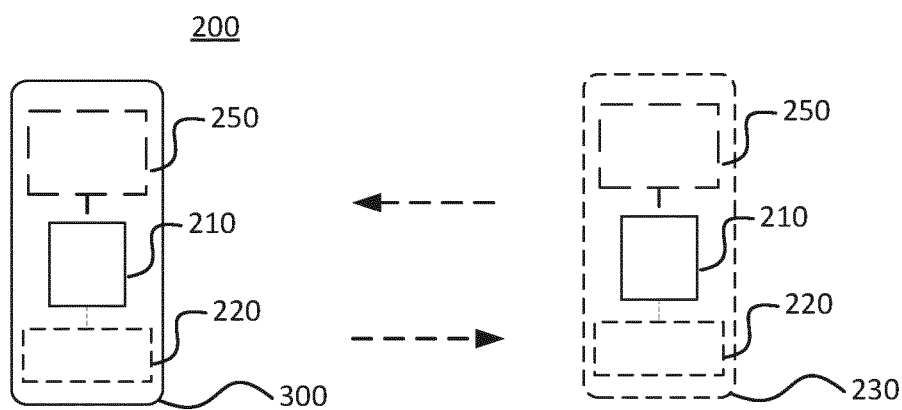
FIG. 2 illustrates a schematic view of a robotic work tool system according to one embodiment.

With reference to FIG. 2, a first embodiment according to the first aspect will now be described. FIG. 2 shows a schematic view of a robotic work tool system 200, the robotic work tool system 200 comprises a boundary definition unit 300 and at least one controller 210. The boundary definition unit 300 may be, for example, a robotic work tool 100. The robotic work tool 100 may be the robotic work tool 100 that is intended to operate within the working area 150. Alternatively, the boundary definition unit 300 may be a mobile device such as a smartphone, a remote control or a position device. The at least one controller 210 may be, for example, a controller 210 located in the boundary definition unit 300. In such embodiments, the boundary definition unit 300 may correspond to the robotic work tool system 200. According to another example, the at least one controller 210 may be located in a device 230 that is separated from the boundary definition unit 300. When the at least one controller 210 is located in another device 230 than in the boundary definition unit 300, the separate device 230 is communicatively coupled to the boundary definition unit 300. They may be communicatively coupled to each other by a wireless communication interface. Additionally, or alternatively, the wireless communication interface may be used to communicate with other devices, such as servers, personal computers or smartphones, charging stations, remote controls, other robotic work tools or any remote device, which comprises a wireless communication interface and a controller. Examples of such wireless communication are Bluetooth®, Global System Mobile (GSM) and Long Term Evolution (LTE), 5G or New Radio (NR), to name a few.

The at least one controller 210 of the robotic work tool system 200 is configured to control the operation of the boundary definition unit 300. In one embodiment, the at least one controller 210 is embodied as software, e.g. remotely in a cloud-based solution. In another embodiment, the at least one controller 210 may be embodied as a hardware controller. The at least one controller 210 may be implemented using any suitable, publicly available processor or Programmable Logic Circuit (PLC). The at least one controller 210 may be implemented using instructions that enable hardware functionality, for example, by using executable computer program instructions in a general-purpose or special-purpose processor that may be stored on a computer readable storage medium (disk, memory etc.) to be executed by such a processor. The controller 210 may be configured to read instructions from a memory 120, 220 and execute these instructions to control the operation of the boundary definition unit 300 including, but not being limited to, the propulsion of the boundary definition unit 300. The memory 120, 220 may be implemented using any commonly known technology for computer-readable memories such as ROM, RAM, SRAM, DRAM, FLASH, DDR, SDRAM or some other memory technology.

The robotic work tool 100, which is intended to operate within the working area 150, may be realized in many different ways. While the present disclosure will mainly be described in general terms of an autonomous robot designed for mowing a lawn, it should be understood that the robotic work tool 100 described herein may be implemented into any type of autonomous machine that may perform a desired activity within a desired working area. Examples of such types of autonomous machines include, without limitation, cleaning robotic work tools, polishing work tools, repair work tools, surface-processing work tools (for indoors and/or outdoors), and/or demolition work tool or the like.

Figure 3:
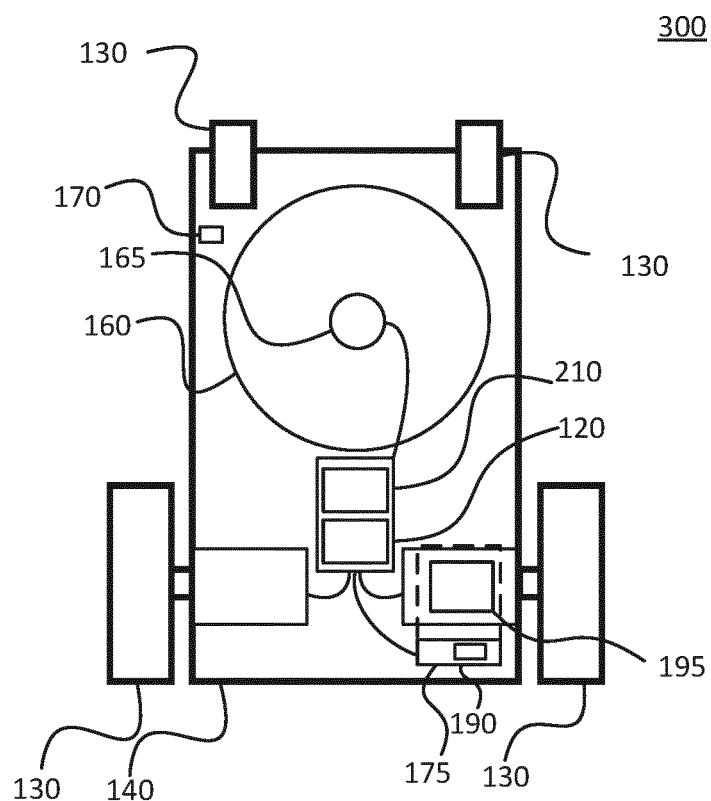
FIG. 3 shows a schematic overview of a boundary definition unit.

FIG. 3 shows a schematic overview of one exemplary boundary definition unit 300. As previously described, the boundary definition unit 300 may be exemplified in a variety of ways, but here the boundary definition unit 300 is exemplified as a robotic work tool 100. The robotic work tool 100 may be, for example, a robotic lawnmower. As will be appreciated, the schematic view is not to scale. FIG. 3 shows a boundary definition unit 300 having a body 140 and a plurality of wheels 130. However, the boundary definition unit 300 is not limited to a boundary definition unit 300 having one single integral body. Alternatively, the boundary definition unit 300 may have a separate front and rear carriages. Furthermore, in cases where the boundary definition unit 300 is exemplified as a smartphone or other similar device, it is appreciated that, the boundary definition unit 300 will not have any wheels.

The boundary definition unit 300 comprises at least one position unit 175. The at least one position unit 175 is configured to receive position data. The position unit 175 may comprises a satellite signal receiver 190, which may be a Global Navigation Satellite System (GNSS) satellite signal receiver. An example of such a system is Global Positioning System (GPS). The at least one position unit 175 may be configured to use, for example, Real-Time Kinematic, RTK, positioning. In advantageous embodiments, the at least one position unit 175 may use RTK-GNSS positioning. A RTK-GNSS system is based on satellite communication. The at least one position unit 175 may be connected to the controller 210 for enabling the controller 210 to determine current positions for boundary definition unit 300.

In some embodiments, the at least one position unit 175 may further comprise a deduced reckoning navigation sensor 195 for providing signals for deduced reckoning navigation, also referred to as dead reckoning. Examples of such deduced reckoning navigation sensors 195 are odometers, inertial measurement units (IMUS) and compasses. These may comprise, for example, wheel tick counters, accelerometers and gyroscopes. Additionally, visual odometry may be used to further strengthen the dead reckoning accuracy. Thus, in some embodiments, the at least one controller 210 may be configured to use dead reckoning to extrapolate the position data if the quality, or the strength, of the position data received from the satellite signal receiver 190 goes below an acceptable level. The dead reckoning may then be based on the last known position received from the satellite signal receiver 190.

According to the present disclosure, the at least one controller 210 is configured to receive, from the at least one position unit 175, position data while the boundary definition unit 300 is moved at least a portion of a lap around the working area 150 to define a preliminary working area perimeter 110. Thus, the at least one controller 210 continuously receives position data relating to the position of boundary definition unit 300 while the boundary definition unit 300 is caused to move.

The at least one controller 210 is thereafter configured to identify, based on the received position data, a geometry approximately corresponding to a predefined geometry. Thus, the at least one controller 210 is configured to identify whether there is any portion of the preliminary working area perimeter 110, which approximately corresponds to a predefined geometry. The predefined geometry may have any shape. For example, the predefined geometry may comprise of at least one from the group comprising a right-angled corner, a corner at a junction between two straight lines and a curve portion with a certain radius of curvature. The radius of curvature may be selectable and may accordingly be of any appropriate radius. This means that the at least one controller 210 identifies if there is a geometry that is similar to a predefined geometry, for example a right-angled corner, but which does not completely, or exactly, correspond to a right-angled corner. Such identified geometry only approximately corresponds to the predefined geometry. It may thus be likely that the identified geometry is supposed to reflect the right-angled corner, but that the boundary definition unit 300, for some reason, has not been able to be moved along the working area 150, all the way into the right-angled corner, such that the received position data correctly reflects the right-angled corner in the perimeter surrounding the working area 150.

Thereafter, the at least one controller 210 is configured to adjust the identified geometry of the preliminary working area perimeter 110 to define an adjusted working area perimeter 105. Thus, the identified geometry is adjusted, or replaced, such that a new adjusted working area perimeter 105 is defined, which better reflects the perimeter surrounding the working area 150. In some embodiments, the at least one controller 210 may be configured to adjust the identified geometry to correspond to the predefined geometry. In these embodiments, if the at least one controller 210 may identify that a geometry approximately corresponds to a predefined geometry, such as a right-angled corner, the identified geometry may be adjusted to be a right-angled corner.

By introducing the above proposed robotic work tool system 200, the previously described disadvantages are eliminated or at least reduced. With the provided robotic work tool system 200, it is possible to refine a defined preliminary working area perimeter 110, such that a more accurate adjusted working area perimeter 105 is defined. As the process of defining the working area perimeter 105 is relatively easy to perform, without having to use physical boundaries, the provided solution is flexible while still providing a working area perimeter 105, which is also accurate when it comes to tight corners or other restricted areas where it may be difficult to manoeuvre the device 300 receiving the position data. By identifying geometries that only approximately correspond to a predefined geometry when defining the working area perimeter 105, it may be possible to refine the perimeter surrounding the working area 150, such that corners or other restricted areas may be taken into account. By adjusting these identified geometries such that an adjusted working area perimeter 105 is defined, the precision of the working area 150 may be further improved. Thus, the provided robotic work tool system 200 provides a working area perimeter 105 that is easy to define, while still being defined with a high precision.

Figure 4:
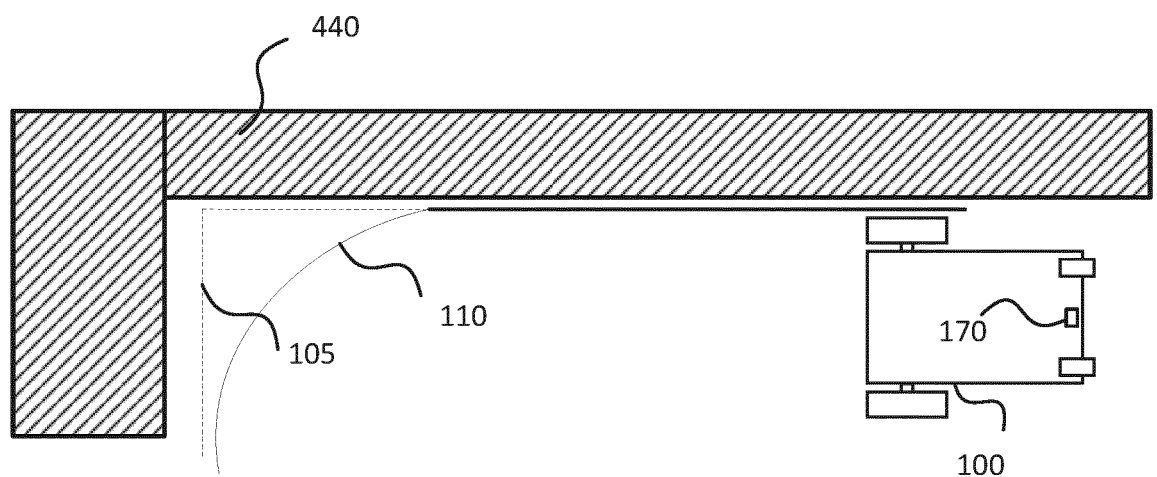
FIG. 4 shows a boundary definition unit moved to define a working area perimeter.

An example of a working area perimeter 105 that is adjusted in accordance with the present disclosure is illustrated in FIG. 4. As seen in FIG. 4, the received position data corresponds to the solid line 110, i.e. the defined preliminary working area perimeter 110. However, it is desirable that the working area perimeter surrounds the complete working area 150, i.e. also within right-angled corners, such the robotic work tool 100 can operate within the complete working area 150. Thus, the robotic work tool system 200 according to the present disclosure, recognizes and identifies a geometry which approximately corresponds to a predefined geometry, i.e. the curved solid line 110 approximately corresponds to a right-angled corner, illustrated as the dashed line 105 in FIG. 4. The work tool system 200 according to the present disclosure then adjusts the identified geometry, i.e. the curved corner, of the preliminary working area 110, to be a right-angled corner and thereby defines an adjusted working area perimeter 105. As is also seen in FIG. 4, the adjusted working area perimeter 105 more accurately reflects the working area 150.

In one embodiment, the at least one controller 210 may be configured to identify a geometry approximately corresponding to a predefined geometry by identifying, based on the received position data, a first substantially straight perimeter segment extending along a first axis. The at least one controller 210 may further be configured to identify, based on the received position data, a second substantially straight perimeter segment extending along a second axis transversal to said first perimeter segment. In this embodiment, the at least one controller 210 may further be configured to adjust the identified geometry of the preliminary working area 110 to define an adjusted working area perimeter 105 by adjusting a corner portion at an intersection between said first and second axes to conform to the predefined geometry. The radius of curvature on the corner portion may be set automatically to connect a tangent of the curvature to where either of the first and the second substantially straight perimeter segment ends. Thus, the robotic work tool system 200 may take some intelligent decisions on where the working area perimeter 105 was intended to be located.

In one embodiment, the robotic work tool system 200 may further comprise a user interface 250, as illustrated in FIG. 2. The user interface 250 may for example be a touch user interface. The user interface 250 may be in an apparatus 230 separated from the boundary definition unit 300, but it may be appreciated that the user interface 250 may be located at the boundary definition unit 300. The user interface 250 may be in the same apparatus as the at least one controller 210.

However, in one embodiment the user interface 250 may be located in a device separate from the at least one controller 210.

The user interface 250 may be configured to display the preliminary working area perimeter 110 and/or the adjusted working area perimeter 105. It may be displayed to a user/operator who is operating the user interface 250. In one embodiment, the preliminary working area perimeter 110 may be displayed in the user interface 250 associated with the adjusted working area perimeter 105, in a way similar as illustrated in FIG. 4.

The user interface 250 may be configured to receive user input from a user during the user's operation and interaction with the user interface 250. The at least one controller 210 may be configured to adjust the identified geometry based on the received user input. Thus, the user may manipulate the defined preliminary working area perimeter 110 by interacting with the user interface 250.

In one exemplary embodiment, the received user input may identify a predefined geometry to adjust the identified geometry with. According to this embodiment, a user, or operator, may decide which predefined geometry that may replace an identified geometry that approximately corresponds to a predefined geometry. Thus, if the robotic work tool system 200 identifies that a portion of the preliminary working area perimeter 110 approximately corresponds to a right-angled corner, the user may choose whether this portion should be adjusted to correspond to a right-angled corner. Alternatively, the user might want to select another predefined geometry and adjust the identified portion to be adjusted to correspond to a curve portion with a certain curvature. In some embodiments, the user may also select the radius of curvature.

In another exemplary embodiment, the received user input may be a portion drawn on freehand of the user. Then, the at least one controller 210 may be configured to adjust the identified geometry of the preliminary working area 110 by replacing the identified geometry of the preliminary working area 110 with the drawn freehand portion to define the adjusted working area perimeter 105.

Figure 5:
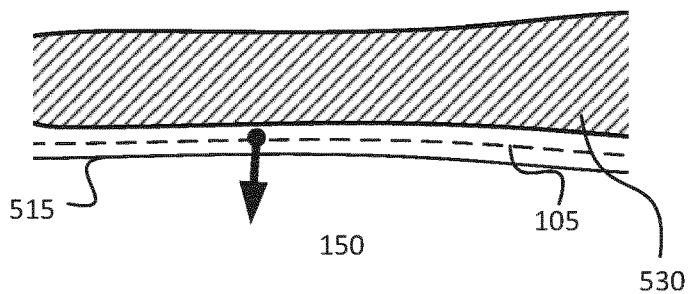
FIG. 5 shows an example of manipulation of a defined working area perimeter by interaction with a user interface.
Figure 6:
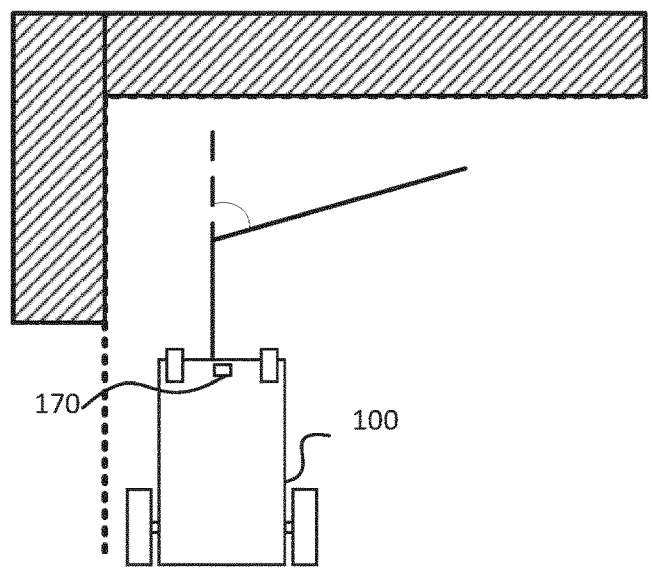
FIG. 6 illustrates an example embodiment of a robotic work tool driven to define at least a portion of working area perimeter.

FIG. 5 schematically illustrates an example embodiment of a view of the user interface 250. The user interface 250 may display the adjusted working area perimeter 105 that the robotic work tool system 200 has defined. If the user for some reason would like to refine the defined working area perimeter 105 even further, it may be possible to do that with the user interface 250. It may be possible to, for example, move the defined adjusted working area perimeter 105 away from the real boundary of the working area 150 by touching and dragging the adjusted working area perimeter 105 towards a new working area perimeter 515.

By providing the user interface 250 as described above, a fast and simple adaptation of the defined working area perimeter 105 may be achieved. For example, if it for some reason is not desirable that the robotic work tool 100 is driven too close to a physical edge 530 when the robotic work tool 100 is operating in the working area 150, this may be achieved by adjusting the defined working area perimeter 105 to be located a bit further away from the physical edge 530.

In some embodiments, the boundary definition unit 300 may further comprise at least one sensor unit 170. The at least one sensor unit 170 is configured to obtain sensed input data. The at least one sensor unit 170 may be configured to obtain the sensed input data while the boundary definition unit 300 is moved at least a portion of a lap around the working area 150 to define a preliminary working area perimeter 110. In these embodiments, the at least one controller 210 may be configured to identify a geometry approximately corresponding to a predefined geometry based on sensed input data.

The obtained sensed input data may, for example, be associated with environmental data. Alternatively, the obtained sensed input data may be associated with a direction of the boundary definition unit 300. The obtained sensed input data may be, without limitations, photo data, odometric data, position data, direction data etc. The at least one sensor unit 170 may be, for example, at least one of a single camera, a stereo camera, a Time-Of-Flight (TOF) camera, a radar sensor, a lidar sensor, an ultrasonic sensor, a compass and, a position unit.

As previously described, the boundary definition unit 300 may be a smartphone or some kind of device, which comprises a position unit 175. Alternatively, the boundary definition unit 300 may be a robotic work tool 100. It is mainly in these embodiments that the boundary definition unit 300 may further comprise at least one sensor unit 170. A robotic work tool 100 may be driven by an operator who manually steers the robotic work tool 100 using e.g. a remote control when defining the preliminary working area perimeter 110. A remote control may be, by way of example, implemented as a software application in a mobile phone. The robotic work tool 100 may be driven at least a portion of a lap around the working area 150 in order to define a perimeter around the working area 150. Preferably, the robotic work tool 100 may be driven a complete lap or substantially a complete lap in order to define a preliminarily perimeter around the working area 150.

In embodiments where the obtained sensed input data may be associated with environmental data, the sensed input data may indicate that a geometry approximately corresponding to a predefined geometry is identified when an obstacle is located in front of the boundary definition unit 300. Thus, when the boundary definition unit 300 moves along the perimeter along the working area 150 and identifies an obstacle, or object, located in front of it, the boundary definition unit 300 has to make a sharp turn in order to avoid the obstacle and to further define the perimeter surrounding the working area 150. When a sharp turn is made, it is likely that the defined preliminary working area 110 will not completely correspond with the desired perimeter surrounding the working area 150, for example due to the turning radius of the boundary definition unit 300. It is thus advantageous that the sensed input data may indicate that a geometry approximately corresponding to a predefined geometry is identified such that the preliminary working area perimeter 110 can be adjusted to define an adjusted working area perimeter 105.

Furthermore, by using sensed input data to indicate that a geometry approximately corresponding to a predefined geometry is identified when an obstacle is located in front of the boundary definition unit 300, it may be possible to adjust the working area perimeter 110 without the boundary definition unit 300 actually having to entering this area. When the at least one controller 210 may receive sensed input data that indicates that a geometry approximately corresponding to a predefined geometry is identified, a geometry that the working area perimeter should be adjusted with could be suggested directly. For example, if the obstacle represents a corner, i.e. a wall straight ahead of the boundary definition unit 300, the sensed input data will indicate that a geometry approximately corresponding to a predefined geometry is identified. Thereafter, the at least one controller 210 may be configured to adjust the geometry of preliminary defined working area perimeter 110 with a right-angled corner without the boundary definition unit 300 actually having to enter this corner.

In embodiments where the obtained sensed input data may be associated with a direction of the boundary definition unit 300, the sensed input data may indicate that a geometry approximately corresponding to a predefined geometry is identified when a change of the direction is above a threshold. Thus, when the boundary definition unit 300 is moved along the perimeter along the working area 150 and makes a sharp turn, i.e. a turn which changes the direction more than a threshold, it is likely that the defined preliminary working area 110 will not completely correspond with the desired perimeter surrounding the working area 250, for example due to that the turn was not made exactly when it was intended. It is thus advantageous that the sensed input data may indicate that a geometry approximately corresponding to a predefined geometry is identified such that the preliminary working area perimeter 110 can be adjusted to define an adjusted working area perimeter 105.

In some embodiments, the at least one controller 210 may be configured to output a notification when a geometry approximately corresponding to a predefined geometry is identified. Thus, a user of the robotic work tool system 200 may be informed about that the robotic work tool system 200 has identified a portion of the preliminary working area perimeter 110 that is to be redefined. This may be advantageous for the user to know, such that the user may have the possibility to pay extra attention to the redefined portions of the working area perimeter 105. Alternatively, this may be an indicator to the user, in cases when the user wants to be involved in the adjustments of the preliminary working area perimeter 110, that the user might have to take some action.

It has to be mentioned that the at least one controller 210 may further be configured to connect all portions and geometries of the defined working area perimeter 105, such that the working area perimeter 105 may be represented by a closed loop. Thus, the provided robotic work tool system 200 may define a working area perimeter 105 that completely surrounds a working area 150. This will prevent a robotic work tool 100 from leaving the defined working area 150. For example, if several portions of the defined working area perimeter has been redefined, the at least one controller 210 assures that all these portions are connected to a continuous working area perimeter 105.

Figure 7:
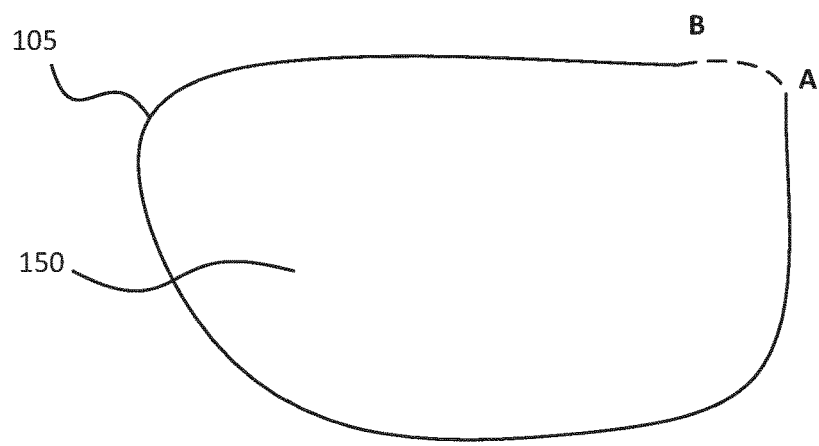
FIG. 7 illustrates an example embodiment of a defined portion of a working area perimeter.

FIG. 7 illustrates an example where the boundary definition unit 300 has been moved from point A to point B in order to define at least a portion of the working area perimeter 105 around the working area 150. As can be seen in FIG. 7, boundary definition unit 300 is not necessarily moved a complete lap around the working area 150, but enough to define the working area 150. In this example, the at least one controller 210 may be configured to close the loop by connecting point A with point B by interpolating the "missing" portion of the lap around the working area 105 such that a closed loop around the working area 150 is defined. This portion is marked as a dashed line between points B and A in FIG. 7. Accordingly, a "connected" working area perimeter 105, i.e. an enclosed area, may be defined regardless of whether the boundary definition unit 300 is moved a complete lap around the working area 150 or not. This may also prevent problems that may arise if the boundary definition unit 300 does not finish the lap around the working area exactly in the same place at the boundary definition unit 300 started the lap.

In one embodiment, the at least one controller 210 of the robotic work tool system 200 may be configured to, after that a closed loop surrounding the working area 150 has been defined, drive the robotic work tool 100, which is intended to operate within the defined working area 150, one lap around the working area 150 guided by the defined working area perimeter 105. The lap may e.g. be driven with the outer wheels 130 of the robotic work tool 100 located at the defined working area perimeter 105. Then it may be possible for a user to view how the working area perimeter 105 has been defined. Thereby, it may be possible to verify that all areas of the working area 150 are covered properly by the robotic work tool system 200 and that all geometries correspond to predefined geometries.

In one advantageous embodiment, the robotic work tool 100 may be a robotic lawn mower.

Figure 8:
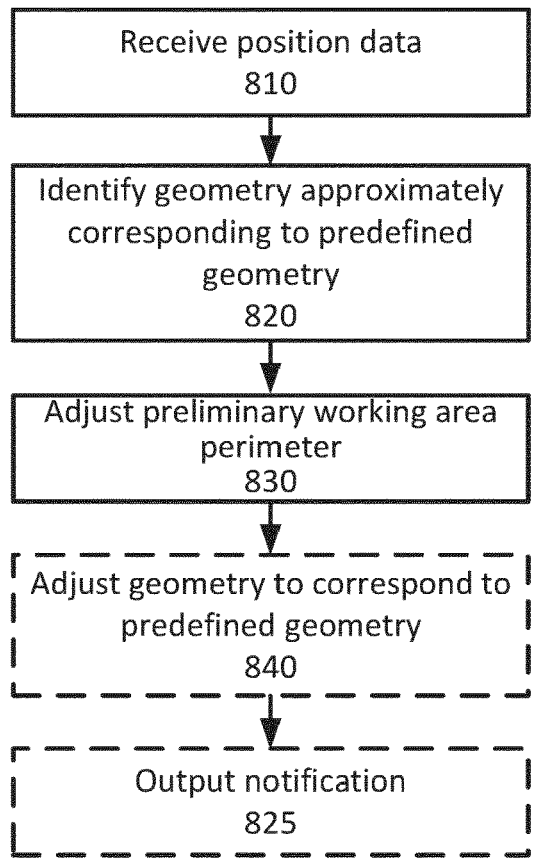
FIG. 8 shows a flowchart of an example method performed by a robotic work tool system.

According to a second aspect, there is provided a method implemented in the robotic work tool system 200 according to the first aspect. The method will be described with reference to FIG. 8.

In one embodiment, the method 800 may be performed by a robotic work tool system 200 for defining a working area perimeter 105 surrounding a working area 150 in which a robotic work tool 100 is subsequently intended to operate. The method 800 starts with step 810 of receiving, from at least one position unit 175 of a boundary definition unit 300, position data while the boundary definition unit 300 is moved at least a portion of a lap around the working area 150 to define a preliminary working area perimeter 110. The method 800 thereafter continues with step 820 of identifying, based on the received position data, a geometry approximately corresponding to a predefined geometry; and step 830 of adjusting the preliminary working area perimeter 110 to define an adjusted working area perimeter 105 by adjusting the identified geometry.

In some embodiments, the method 800 may further comprise the step 840 of adjusting the identified geometry to correspond to the predefined geometry.

In some embodiments, the method 800 may further comprise identifying a geometry approximately corresponding to a predefined geometry by identifying, based on the received position data, a first substantially straight perimeter segment extending along a first axis. The method 800 may further comprise identifying, based on the received position data, a second substantially straight perimeter segment extending along a second axis transversal to said first perimeter segment. The method 800 may thereafter comprise adjusting a corner portion at an intersection between said first and second axes to conform to the predefined geometry.

In some embodiment, the method 800 may further comprise identifying a geometry approximately corresponding to a predefined geometry based on sensed input data, received from a user interface 250 of the robotic work tool system 200.

In some embodiments, the method 800 may further comprise step 850 of outputting a notification when a geometry approximately corresponding to a predefined geometry is identified.

With the proposed method 800, it may be easy to define a working area perimeter 105, while the perimeter 105 is still being defined with a high precision. By identifying geometries that only approximately correspond to a predefined geometry when defining the working area perimeter 105, it may be possible to refine the perimeter surrounding the working area 150, such that corners or other restricted areas may be taken into account. By adjusting these identified geometries such that an adjusted working area perimeter 105 is defined, the precision of the working area 150 may be further improved.

Figure 9:
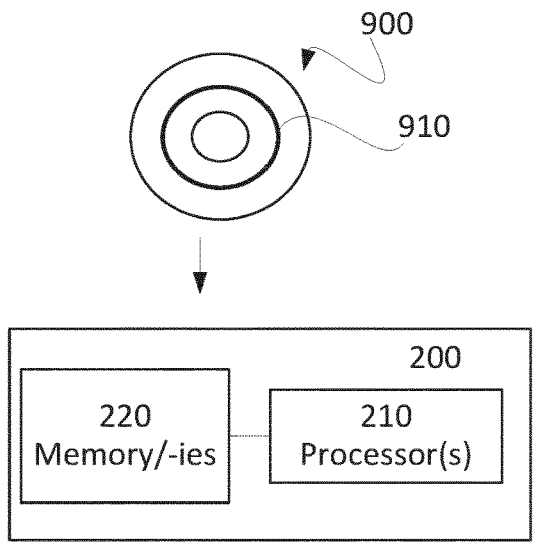
FIG. 9 shows a schematic view of a computer-readable medium according to the teachings herein.

FIG. 9 shows a schematic view of a computer-readable medium as described in the above. The computer-readable medium 900 is in this embodiment a data disc 900. In one embodiment, the data disc 900 is a magnetic data storage disc. The data disc 900 is configured to carry instructions 910 that when loaded into a controller, such as a processor, execute a method or procedure according to the embodiments disclosed above. The data disc 900 is arranged to be connected to or within and read by a reading device, for loading the instructions into the controller. One such example of a reading device in combination with one (or several) data disc(s) 900 is a hard drive. It should be noted that the computer-readable medium can also be other mediums such as compact discs, digital video discs, flash memories or other memory technologies commonly used. In such an embodiment, the data disc 900 is one type of a tangible computer-readable medium 900.

The instructions 910 may also be downloaded to a computer data reading device, such as the controller 210 or other device capable of reading computer coded data on a computer-readable medium, by comprising the instructions 910 in a computer-readable signal which is transmitted via a wireless (or wired) interface (for example via the Internet) to the computer data reading device for loading the instructions 910 into a controller. In such an embodiment, the computer-readable signal is one type of a non-tangible computer-readable medium 900.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A robotic lawnmower system for defining a working area perimeter surrounding a working area in which a robotic lawnmower is subsequently intended to operate, the robotic lawnmower system comprising:
a boundary definition unit comprising at least one position unit configured to receive position data;
at least one controller for controlling operation of the boundary definition unit, the at least one controller being configured to:
receive, from the at least one position unit, position data while the boundary definition unit is moved at least a portion of a lap around the working area to define a preliminary working area perimeter;
identify, based on the received position data, a geometry of the preliminary working area perimeter approximately corresponding to a predefined geometry; and
adjust a physical position of a boundary of the preliminary working area perimeter to define an adjusted working area perimeter, wherein adjusting the physical position of the boundary of the preliminary working area perimeter comprises adjusting the identified geometry of the preliminary working area perimeter to correspond to the predefined geometry in the adjusted working area perimeter,
wherein the at least one controller is configured to identify a geometry approximately corresponding to a predefined geometry by:
identifying, based on the received position data, a first substantially straight perimeter segment extending along a first axis;
identifying, based on the received position data, a second substantially straight perimeter segment extending along a second axis transversal to said first perimeter segment,
wherein the at least one controller is configured to adjust the identified geometry of the preliminary working area to define an adjusted working area perimeter by:
adjusting a corner portion at an intersection between said first and second axes to conform to the predefined geometry, and
wherein a radius of curvature of the corner portion is set automatically to connect a tangent of the curvature to where either of the first and the second substantially straight perimeter segment ends.

2. The robotic lawnmower system according claim 1, wherein the predefined geometry comprises of at least one from the group comprising: a right-angled corner, a corner at a junction between two straight lines and a curve portion with a certain radius of curvature.

3. The robotic lawnmower system according to claim 2, wherein the radius of curvature is selectable.

4. The robotic lawnmower system according to claim 1, wherein the robotic lawnmower system further comprises a user interface configured to display the preliminary working area perimeter and the working area perimeter.

5. The robotic lawnmower system according to claim 4, wherein the user interface is configured to receive user input from a user during the user's operation and interaction with said user interface, wherein the at least one controller is configured to adjust the identified geometry based on the received user input.

6. The robotic lawnmower system according to claim 5, wherein received user input identifies a predefined geometry to adjust the identified geometry with.

7. The robotic lawnmower system according to claim 1, wherein the boundary definition unit further comprises at least one sensor unit configured to obtain sensed input data while the boundary definition unit is moved at least a portion of a lap around the working area to define a preliminary working area perimeter and wherein the at least one controller is further configured to identify a geometry approximately corresponding to a predefined geometry based on sensed input data.

8. The robotic lawnmower system according to claim 7, wherein the sensed input data is associated with environmental data and wherein the sensed input data indicating that a geometry approximately corresponding to a predefined geometry is identified when an obstacle is located in front of the boundary definition unit.

9. The robotic lawnmower system according to claim 7, wherein the sensed input data is associated with a direction of the boundary definition unit and wherein the sensed input data indicating that a geometry approximately corresponding to a predefined geometry is identified when a change of the direction is above a threshold.

10. The robotic lawnmower system according to claim 1, wherein the at least one controller is configured to output a notification when a geometry approximately corresponding to a predefined geometry is identified.

11. The robotic lawnmower system according to claim 1, wherein the at least one position unit is configured to use a Global Navigation Satellite System, GNSS.

12. The robotic lawnmower system according claim 11, wherein the at least one position unit is configured to use Real-Time Kinematic, RTK, positioning.

13. The robotic lawnmower system according to claim 1, wherein the boundary definition unit is the robotic lawnmower.

14. A method performed by a robotic lawnmower system for defining a working area perimeter surrounding a working area in which a robotic lawnmower is subsequently intended to operate, wherein the method comprises:
  receiving, from at least one position unit of a boundary definition unit, position data while the boundary definition unit is moved at least a portion of a lap around the working area to define a preliminary working area perimeter;
  identifying, based on the received position data, a geometry of the preliminary working area perimeter approximately corresponding to a predefined geometry; and
  adjusting the preliminary working area perimeter to define an adjusted working area perimeter by adjusting a physical position of a boundary of the preliminary working area perimeter, wherein adjusting the physical position of the boundary of the preliminary working area perimeter comprises adjusting the identified geometry of the preliminary working area perimeter to correspond to the predefined geometry in the adjusted working area perimeter,
  wherein the boundary definition unit further comprises at least one sensor unit configured to obtain sensed input data while the boundary definition unit is moved and wherein at least one controller is further configured to identify a geometry approximately corresponding to a predefined geometry based on sensed input data, and
  wherein the sensed input data is associated with a direction of the boundary definition unit and wherein the sensed input data indicating that a geometry approximately corresponding to a predefined geometry is identified when a change of the direction is above a threshold.

15. A robotic lawnmower system for defining a working area perimeter surrounding a working area in which a robotic lawnmower is subsequently intended to operate, the robotic lawnmower system comprising:
  a boundary definition unit comprising at least one position unit configured to receive position data;
  at least one controller for controlling operation of the boundary definition unit, the at least one controller being configured to:
  receive, from the at least one position unit, position data while the boundary definition unit is moved at least a portion of a lap around the working area to define a preliminary working area perimeter;
  identify, based on the received position data, a geometry of the preliminary working area perimeter approximately corresponding to a predefined geometry; and
  adjust the identified geometry of the preliminary working area perimeter to define an adjusted working area perimeter, wherein the identified geometry of the preliminary working area perimeter is adjusted to correspond to the predefined geometry,
  wherein the robotic lawnmower system further comprises a user interface configured to display the preliminary working area perimeter and the working area perimeter, and
  wherein the user interface is configured to receive user input from a user during the user's operation and interaction with said user interface, wherein the at least one controller is configured to adjust the identified geometry based on the received user input.

16. The robotic lawnmower system according to claim 15, wherein received user input identifies a predefined geometry to adjust the identified geometry with.

17. The robotic lawnmower system according claim 15, wherein the predefined geometry comprises of at least one from the group comprising: a right-angled corner, a corner at a junction between two straight lines and a curve portion with a certain radius of curvature.

* * * * *